(12) United States Patent
Sawada et al.

(10) Patent No.: US 11,379,043 B2
(45) Date of Patent: Jul. 5, 2022

(54) CONTROLLER APPARATUS, CONTROLLER APPARATUS CONTROLLING METHOD, AND PROGRAM

(71) Applicant: Sony Interactive Entertainment Inc., Tokyo (JP)

(72) Inventors: Takuro Sawada, Tokyo (JP); Takashi Enokihara, Ibaraki (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/090,104

(22) Filed: Nov. 5, 2020

(65) Prior Publication Data

US 2021/0149490 A1 May 20, 2021

(30) Foreign Application Priority Data

Nov. 19, 2019 (JP) .............................. JP2019-209031

(51) Int. Cl.
  *G06F 3/01* (2006.01)
  *A63F 13/218* (2014.01)
  *A63F 13/285* (2014.01)

(52) U.S. Cl.
  CPC ............ *G06F 3/016* (2013.01); *A63F 13/218* (2014.09); *A63F 13/285* (2014.09); *G06F 2203/015* (2013.01)

(58) Field of Classification Search
  None
  See application file for complete search history.

(56) References Cited

U.S. PATENT DOCUMENTS 10,881,953 B2    1/2021 Yamano
2013/0194085 A1* 8/2013 Grant .................... A63F 13/285
                                                          340/407.2
(Continued)

FOREIGN PATENT DOCUMENTS

JP        6149895 B2    6/2017
WO     2016186041 A1   11/2016
(Continued)

OTHER PUBLICATIONS

Extended European Search Report for corresponding EP Application No. 20205909.3, 7 pages, dated Apr. 12, 2021.
(Continued)

*Primary Examiner* — Carl Adams
(74) *Attorney, Agent, or Firm* — Matthew B. Dernier, Esq.

(57) ABSTRACT

Disclosed herein is a controller apparatus including a vibrating body movable within a predetermined movable range thereof, an operating member operated by a user, the operating member being movably operable within a movable range thereof overlapping partially with the movable range of the vibrating body, a reception section configured to receive a vibration instruction designating generation of vibration, a detection section configured to detect a position of the operating member within the movable range thereof, and a control section configured to give vibration to the operating member by controlling a position and vibration of the vibrating body in accordance with the received vibration instruction and the detected position of the operating member. When predetermined conditions are satisfied, the control section controls the vibration of the vibrating body in a manner correcting the vibration designated by the vibration instruction.

6 Claims, 4 Drawing Sheets

(56) References Cited

U.S. PATENT DOCUMENTS

| | | | | |
|---|---|---|---|---|
| 2013/0285910 A1* | 10/2013 | Adachi | ............... | G06F 3/016 |
| | | | | 345/173 |
| 2019/0224565 A1 | 7/2019 | Ikuo | | |
| 2019/0308097 A1* | 10/2019 | Yamano | ............... | G06F 3/016 |
| 2020/0333883 A1 | 10/2020 | Doucet | | |

FOREIGN PATENT DOCUMENTS

| WO | 2018016107 A1 | 1/2018 |
|---|---|---|
| WO | 2019107207 A1 | 6/2019 |
| WO | 2019142873 A1 | 1/2021 |

OTHER PUBLICATIONS

Notice of Reason for Refusal for corresponding JP Application No. 2019-209031, 6 pages, dated Oct. 1, 2021.

* cited by examiner

F I G . 5
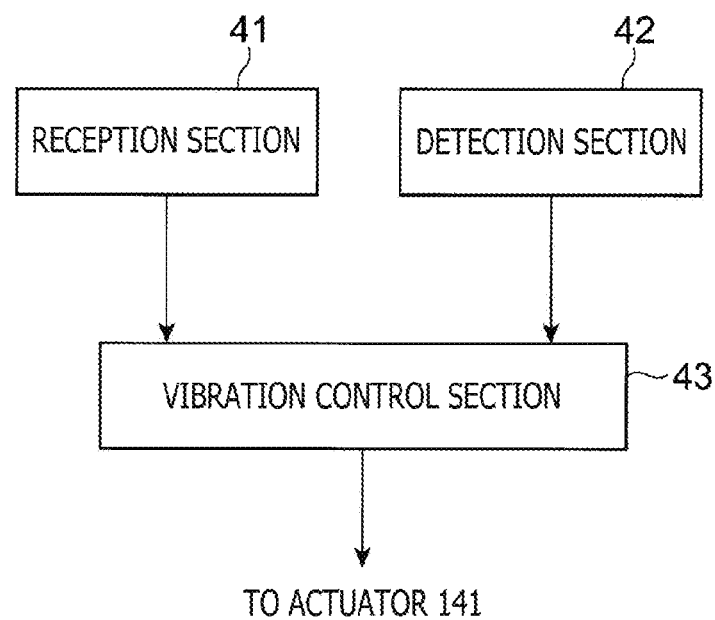

CONTROLLER APPARATUS, CONTROLLER APPARATUS CONTROLLING METHOD, AND PROGRAM

CROSS REFERENCE TO RELATED APPLICATIONS

This application claims the benefit of Japanese Priority Patent Application JP 2019-209031 filed Nov. 19, 2019, the entire contents of which are incorporated herein by reference.

BACKGROUND

The present disclosure relates to a controller apparatus, a controller apparatus controlling method, and a program.

There exists a controller apparatus furnished with a push-in button arranged to be movable between a predetermined first position and a predetermined second position. The push-in button biased in the first position can be pushed in the direction of the second position by a user's push-in operation.

This controller apparatus may also be furnished with a vibration mechanism coming into contact periodically with a back side of the push-in button (i.e., an opposite side of a side pushed in by the user) so as to vibrate the push-in button.

SUMMARY

One problem with the above-mentioned controller apparatus incorporating the existing vibration mechanism is that with the push-in button moved to the second position, activating the vibration mechanism can propagate vibration to various components of the controller apparatus in a manner generating an unintended vibration noise.

The present disclosure has been devised in view of the above circumstances, and it is desirable to provide a controller apparatus, a controller apparatus controlling method, and a program for suppressing the generation of an unintended vibration noise.

According to an embodiment of the present disclosure, there is provided a controller apparatus including a vibrating body movable within a predetermined movable range thereof, an operating member operated by a user, the operating member being movably operable within a movable range thereof overlapping partially with the movable range of the vibrating body, a reception section configured to receive a vibration instruction designating generation of vibration, a detection section configured to detect a position of the operating member within the movable range thereof, and a control section configured to give vibration to the operating member by controlling a position and vibration of the vibrating body in accordance with the received vibration instruction and the detected position of the operating member. When predetermined conditions are satisfied, the control section controls the vibration of the vibrating body in a manner correcting the vibration designated by the vibration instruction.

According to another embodiment of the present disclosure, there is provided a controller apparatus controlling method for use with a controller apparatus including a vibrating body movable within a predetermined movable range thereof, an operating member operated by a user, the operating member being movably operable within a movable range thereof overlapping partially with the movable range of the vibrating body, a reception section configured to receive a vibration instruction designating generation of vibration, a detection section configured to detect a position of the operating member within the movable range thereof, and a control section. The controller apparatus controlling method includes causing the control section to give vibration to the operating member by controlling a position and vibration of the vibrating body in accordance with the received vibration instruction and the detected position of the operating member, and causing the control section, when predetermined conditions are satisfied, to control the vibration of the vibrating body in a manner correcting the vibration designated by the vibration instruction.

According to a further embodiment of the present disclosure, there is provided a program for use with a controller apparatus including a vibrating body movable within a predetermined movable range thereof, an operating member operated by a user, the operating member being movably operable within a movable range thereof overlapping partially with the movable range of the vibrating body, a reception section configured to receive a vibration instruction designating generation of vibration, a detection section configured to detect a position of the operating member within the movable range thereof, and a control section. The program includes causing the control section to give vibration to the operating member by controlling a position and vibration of the vibrating body in accordance with the received vibration instruction and the detected position of the operating member and, when predetermined conditions are satisfied, causing the control section to control the vibration of the vibrating body in a manner correcting the vibration designated by the vibration instruction.

According to the embodiments of the present disclosure, the generation of an unintended vibration noise is suppressed.

BRIEF DESCRIPTION OF THE DRAWINGS

FIG. 5 is a functional block diagram of a control section included in the controller apparatus according to the embodiment of the present disclosure.

DETAILED DESCRIPTION OF THE PREFERRED EMBODIMENT

Figure 1:
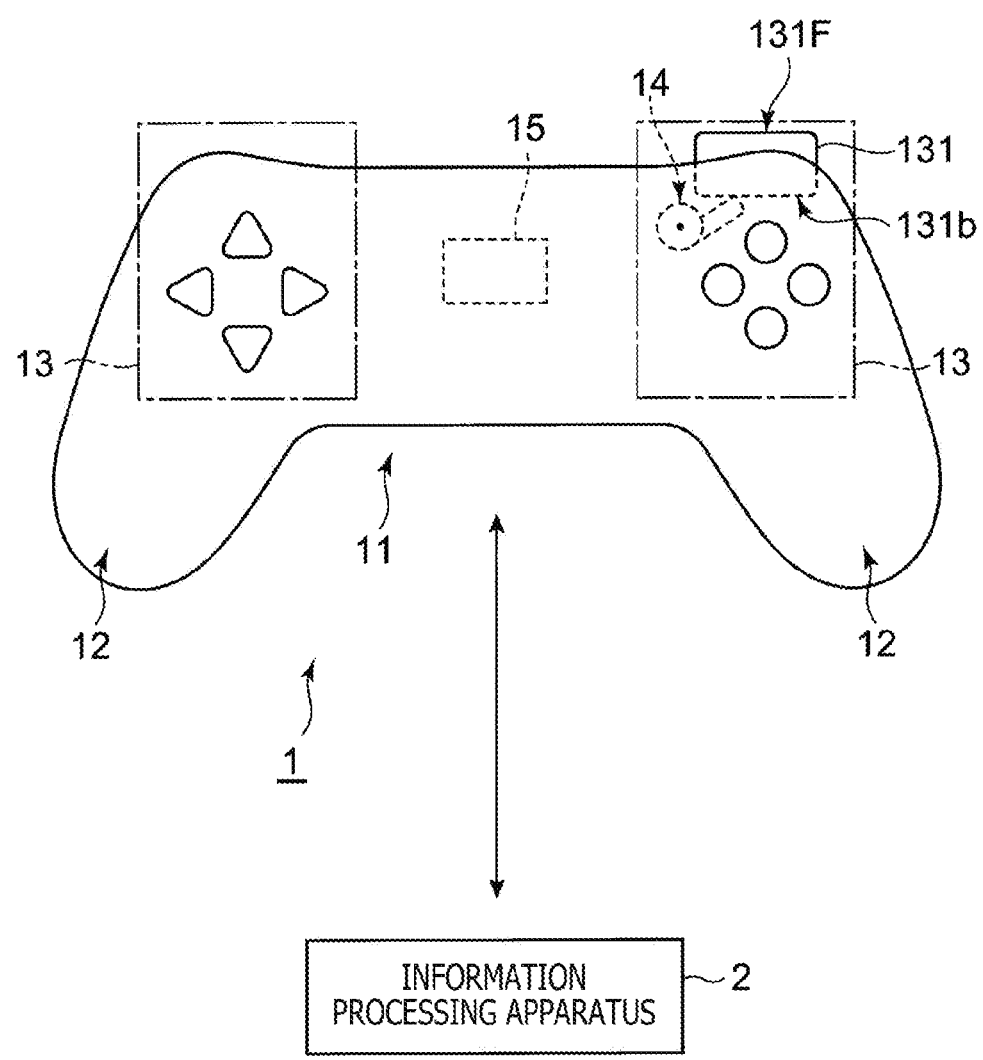
FIG. 1 is a schematic explanatory diagram depicting a typical configuration of a controller apparatus according to one embodiment of the present disclosure.

A preferred embodiment of the present disclosure is described below with reference to the accompanying drawings. As depicted in FIG. 1, a controller apparatus 1 according to the embodiment of the present disclosure includes a main body section 11, grips 12 that extend from both sides of the main body section 11 to the front side of the main body section 11, an operation section 13 arranged on the main body section 11, a vibration presentation section 14, and a circuit section 15. The controller apparatus 1 sends and receives operation-related information to and from an information processing apparatus 2.

The operation section 13 of the controller apparatus 1 in this embodiment includes a push-in button 131 to be pushed for operation by a user. The operation section 13 may also include other buttons and controls such as joysticks to be tilted for operation as well as arrow keys. As an example here of the embodiment, the push-in button 131 is positioned to be operable with the index finger or the middle finger of the user holding the grips 12 of the controller apparatus 1 with the balls of the thumbs, little fingers, and ring fingers.

The push-in button 131 is formed to be substantially columnar. The push-in button 131 has an external surface 131F exposed outside a housing and touched by the user's fingertip, and a back surface 131B that is located inside the housing and has its normal line in parallel or substantially parallel (within a predetermined range of angles relative to the parallel) with the push-in direction.

In this example of the embodiment, when not operated by the user, the push-in button 131 has its external surface 131F forced into a default position typically by an elastic body. When pushed into the housing of the controller apparatus 1 by the user, the external surface 131F moves into the housing up to a limit position defined by a mechanically predetermined range.

The push-button 131 electrically detects its pushed-in position and outputs information indicative of the detected pushed-in position to the circuit section 15. The method of detecting the pushed-in position involves using various well-known sensors and thus will not be discussed further.

Figure 2:
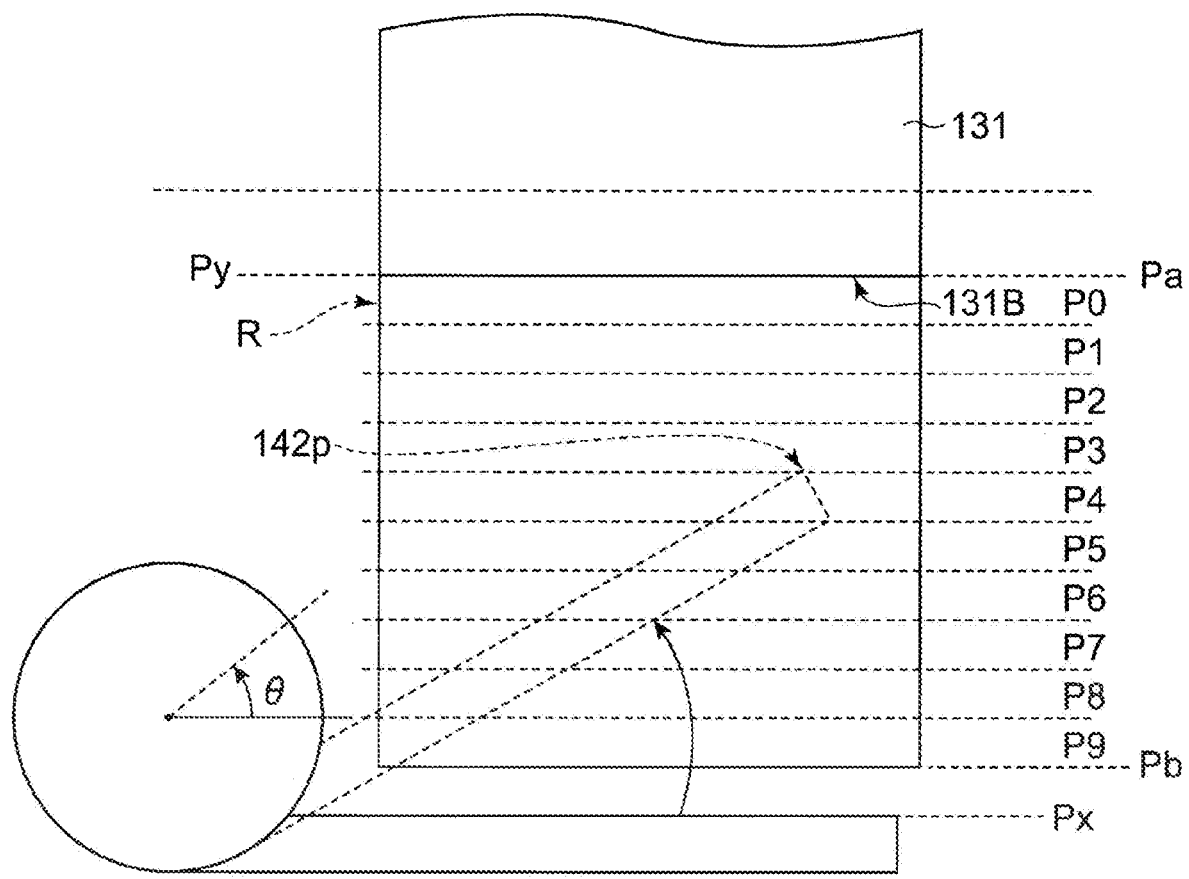
FIG. 2 is an explanatory diagram depicting a relation between a push-in button and a vibration presentation section of the controller apparatus according to the embodiment of the present disclosure.

Here, the pushed-in position is represented by the position of the back surface 131B of the push-in button 131 as depicted in FIG. 2. It is assumed that a first position Pa denotes the position of the back surface 131B at the time the external surface 131F is in the default position and that a second position Pb stands for the position of the back surface 131B at the time the external surface 131F is pushed into the housing up to the limit position. Thus the position of the push-in button 131 is between the first position Pa and the second position Pb, i.e., within the stroke of the button 131 (moving range R).

The vibration presentation section 14 vibrates the push-in button 131, thereby presenting the user operating the push-in button 131 with vibration. A specific configuration and operations of the vibration presentation section 14 will be discussed later.

Figure 3:
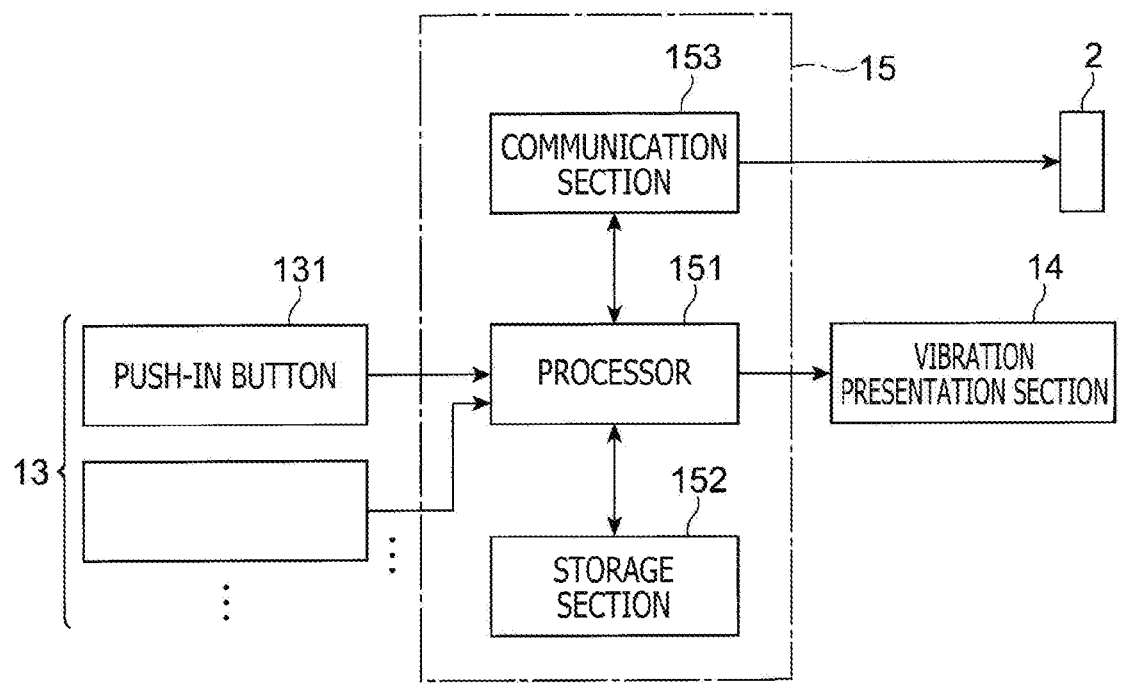
FIG. 3 is a block diagram depicting a typical circuit configuration of the controller apparatus according to the embodiment of the present disclosure.

The circuit section 15 receives from the operation section 13 information indicative of the details of operation performed by the user on the controller apparatus 1. The circuit section 15 outputs the received information to the information processing apparatus 2. In one example of this embodiment, as depicted in FIG. 3, the circuit section 15 includes a processor 151, a storage section 152, and a communication section 153.

Here, the processor 151 is a program-controlled device that operates in accordance with programs held in the storage section 152. In this embodiment, the processor 151 receives from the operation section 13 information indicative of operation details including the push-in amount of the push-in button 131 in the operation section 13. The processor 151 outputs the received information regarding the operation details to the information processing apparatus 2. The processor 151 further controls the vibration presentation section 14. The operation of the processor 151 will be discussed later in detail.

The storage section 152 is a memory device that holds the programs to be executed by the processor 151. The storage section 152 also acts as a work memory for the processor 151.

The communication section 153 sends and receives information to and from the information processing apparatus 2 by wire or wirelessly. That is, under instructions input from the processor 151, the communication section 153 outputs information indicative of processing details to the information processing apparatus 2. The communication section 153 further outputs to the processor 151 diverse information received from the information processing apparatus 2.

In an example of this embodiment, the controller apparatus 1 may further include a tilt sensor (not depicted), push switches, and joysticks to be tilted for operation. In this case, the processor 151 sends to the information processing apparatus 2 the information indicative of the operation details including the posture of the controller apparatus 1 detected by the tilt sensor (tilt angle information) as well as information regarding push switch and joystick operations.

[Configuration and Operations of the Vibration Presentation Section]

Figure 4:
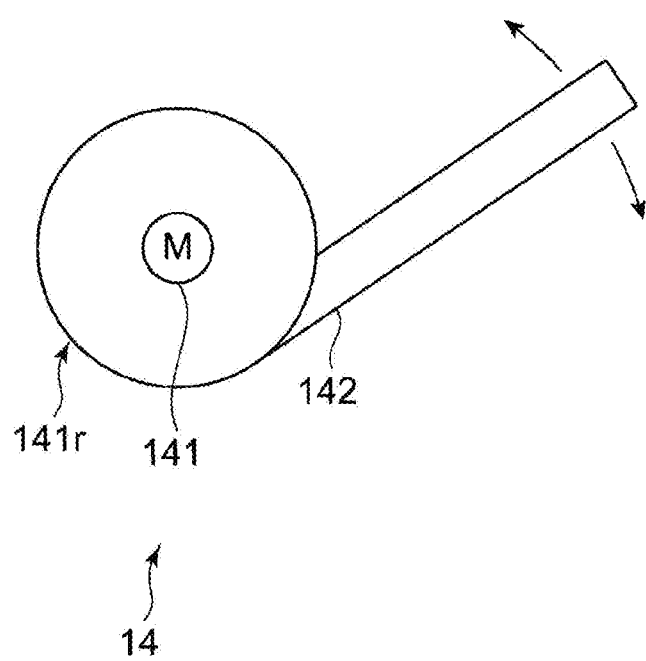
FIG. 4 is a schematic explanatory diagram depicting a typical vibration presentation section of the controller apparatus according to the embodiment of the disclosure.

A typical configuration and operations of the vibration presentation section 14 are explained below. In this embodiment, the vibration presentation section 14 vibrates the push-in button 131 to present the user operating the push-in button 131 with vibration. In a specific example, as depicted in FIG. 4, the vibration presentation section 14 includes an actuator 141 and an arm 142 (corresponding to a vibrating body of the present disclosure) rotated by the actuator 141.

Here, the actuator 141 is controlled by the processor 151 in the circuit section 15. The actuator 141 has a rotating shaft 141r furnished with the arm 142 extending in the direction of a circumference tangent of the shaft. Under instructions input from the processor 151, the actuator 141 rotates the arm 142 in a designated direction around the rotating shaft 141r. The actuator 141 further includes an encoder that acquires information regarding a rotation angle θ of the rotating shaft 141r relative to a reference angle in a predetermined reference state (e.g., in which the arm 142 is fully retracted into the housing). The actuator 141 outputs the rotation angle information to the processor 151.

In this embodiment, by the operation of the actuator 141, a tip of the arm 142 moves in a range overlapping with a moving range (movement trajectory) R of the back surface 131B of the push-in button 131 depicted in FIG. 2. Specifically, on the underside (into the housing), the tip of the arm 142 has its limit position located in a position Px further into the housing past the second position Pb. On the upper side (on the side of the button 131), the tip of the arm 142 has its limit position located in a position Py further into the housing past the first position Pa.

Thus, in this embodiment, a moving range Px-Py of the arm 142 as the vibrating body (i.e., vibrating body moving range) overlaps partially with the moving range R of the push-in button 131 (its back surface 131B).

The operation of the processor 151 is explained next. In this embodiment, the processor 151 is connected communicably with the information processing apparatus 2 by wire or wirelessly. When acting in accordance with the programs held in the storage section 152, the processor 151 functionally implements a configuration that includes a reception section 41, a detection section 42, and a vibration control section 43 as depicted in FIG. 5.

The reception section 41 receives an instruction to generate vibration (vibration instruction) from the information processing apparatus 2, and outputs the received instruction to the vibration control section 43. This instruction includes vibration strength information indicative of the strength of the vibration. The reception section 41 further receives an instruction to end vibration (vibration end instruction) from the information processing apparatus 2, and outputs the received instruction to the vibration control section 43.

The detection section 42 receives information regarding the position within the moving range R of the back surface 131B of the push-in button 131 used as an operating member, detects the position Q of the back surface 131B of the push-in button 131, and outputs the information indicative of the detected position Q.

The vibration control section 43 gives vibration to the push-in button 131 by controlling the rotational position and vibration of the actuator 141 in the vibration presentation section 14 in accordance with the vibration instruction received by the reception section 41 for vibration generation and with the information regarding the position of the push-in button 131 (the position of its back surface 131B) detected by the detection section 42.

Specifically, upon receipt of the vibration instruction by the reception section 41, the vibration control section 43 in this embodiment controls the rotational position of the actuator 141 in such a manner that the arm 142 comes into contact with the position Q of the back surface 131B of the push-in button 131 detected by the detection section 42.

In an example of this embodiment, the vibration control section 43 obtains information regarding the position of the arm 142 on the basis of the rotation angle information regarding the rotating shaft 141r, the information being output by the actuator 141 (in the ensuing description, the position of the arm 142 refers to a point 142p that is part of the tip of the substantially columnar arm 142 and is closest to an outer circumference of the housing). In keeping with the information indicative of the position of the back surface 131B of the push-in button 131 (within the moving range R) and indicative of the position of the arm 142 (corresponding to the rotational position of the actuator 141), the vibration control section 43 generates position range information quantitatively representing each of 10 stages (P0 to P9 in FIG. 2) in which the moving range R and the movable range of the arm 142 overlap with each other.

Then, the vibration control section 43 controls the rotational position of the actuator 141 in such a manner that when the position Q of the back surface 131B of the push-in button 131 detected by the detection section 42 is in the quantified position stage P4, for example, the arm 142 is moved to a target position inside the position stage P4 (e.g., to the center of the position stage P4).

While controlling an amplitude of the rotation angle of the actuator 141 on the basis of the vibration strength information included in the vibration instruction received by the reception section 41, the vibration control section 43 causes the actuator 141 to reciprocate continuously across the controlled amplitude in a manner causing the arm 142 to also reciprocate continuously across that amplitude. As a result, the arm 142 enters a vibrating state (under vibration control). At this point, the amplitude of the rotation angle is within the range between two angles: the angle at which the position of the arm 142 is rotated by θa from a target angle θt corresponding to the above-mentioned target position in the direction in which the arm 142 is caused to approach a position Px (in the direction in which the arm 142 is retracted into the housing) on one hand, and the angle at which the position of the arm 142 is rotated by θb from the target angle θt in the direction in which the arm 142 is caused to approach a position Py (in the direction in which the push-in button 131 is pushed up) on the other hand. Here, the angle θa is set using a monotonically increasing function in which, given a strength value "s" represented by the vibration strength information received by the reception section 41, the angle θa is set for θa=α·s (α is an experimentally determined positive constant), for example. The angle θb may be a predetermined value. Alternatively, as with the angle θa, the angle θb may be set using a monotonically increasing function in which, given the strength value "s," the angle θb is set for θb=β·s (as with α, β is an experimentally determined positive constant), for example.

When controlling the vibration of the arm 142, the vibration control section 43 initially sets, for example, θt−θa as the target angle for the actuator 141. Thereafter, whenever the actuator 141 stops rotating or every time the actuator 141 reaches the target position, the vibration control section 43 sets θt+θb or θt−θa alternately as the target angle for the actuator 141 and causes the actuator 141 to reciprocate accordingly.

The vibration control section 43 vibrates the arm 142 continuously until the reception section 41 receives the vibration end instruction to terminate vibration. While continuing the vibration, the vibration control section 43 repeatedly acquires the information regarding the position of the push-in button 131B detected by the detection section 42. Every time the position information is changed, the vibration control section 43 controls the rotational position of the actuator 141 in a manner bringing the arm 142 into contact with the changed position for continuous vibration.

One thing characterizing this embodiment is that when in a state where predetermined conditions are satisfied, the vibration control section 43 controls the vibration of the arm 142 in a manner correcting the vibration designated by the vibration instruction received by the reception section 41 (e.g., the vibration is controlled on the basis of the strength value obtained by correcting the vibration strength value represented by the vibration strength information).

The conditions here may include one specifying that the back surface 131B of the push-in button 131 as one operating member be in a position stage close to the second position Pb (i.e., the above-mentioned position stage P9). That is, in this example of the embodiment, while the arm 142 is being vibrated, for example, moving the back surface 131B of the push-in button 131 to a position within the position stage P9 (i.e., the user pushes the push-in button 131 into a position close to the limit) causes the vibration control section 43 to control the vibration of the arm 142 with a strength obtained by correcting the designated vibration strength.

The correction of the vibration strength may alternatively involve causing the strength value represented by the designated vibration strength information to be multiplied by a parameter defined by a predetermined function. For example, this function is determined for each different condition. Given a condition specifying that the back surface 131B of the push-in button 131 be in a position P (position stage P9 in the above-mentioned 10-stage position range) close to the second position Pb, the function may be a monotonic function of the position P such that the smaller the difference is between the position P of the back surface 131B of the push-in button 131 on one hand and the position Pb as the most pushed-in position of the back surface 131B of the push-in button 131 on the other hand, the closer the parameter is to "0," and that the larger the difference becomes, the closer the parameter is to "1" (wherever the position, the value is between "0" and "1" inclusive). The value of the strength is corrected by multiplying the strength value designated by the vibration strength information, by the parameter defined by the monotonic function of the position P.

In this example of the correction, the user pushes in the push-in button 131. With the back surface 131B of the push-in button 131 within the position stage P9, the user further pushes in the push-in button 131. The vibration of the arm 142 is then controlled in such a manner that the closer the back surface 131B is to the limit position, the smaller the strength becomes with which the arm 142 is vibrated than the vibration strength designated by the information processing apparatus 2. This makes it possible to sufficiently reduce the vibration when the push-in button 131 is pushed to its limit position, which prevents the vibration from propagating to various components of the controller apparatus 1 and inhibits an unintended vibration noise from being generated.

[Other Typical Conditions]

It has been explained above that the condition specifies that the back surface 131B of the push-in button 131 be in the position P close to the second position Pb (within the position stage P9). However, this is not limitative of the condition in which the vibration is corrected with this embodiment.

For example, in this embodiment, the vibration may be corrected on the condition that when the arm 142 is controlled to be vibrated, the push-in button 131 is operated and moved by the user from the current position.

Specifically, given the vibration instruction in this embodiment, the vibration control section 43 controls the rotational position of the actuator 141 in such a manner that the tip of the arm 142 is moved to the position Q of the back surface 131B of the push-in button 131 detected by the detection section 42.

That is, the vibration control section 43 sets the target position to which to move the tip of the arm 142 at the position Q of the back surface 131B of the push-in button 131. The vibration control section 43 further sets the target angle at the rotation angle θt of the actuator 141 at the time the arm 142 is rotated until its tip reaches the target position. Then, on the basis of information regarding the current rotation angle and the target angle output by the actuator 141, the vibration control section 43 controls the rotation direction and rotation velocity (typically represented by the current supplied to the actuator 141) of the actuator 141. This control may be implemented using a common feedback control scheme and thus will not be discussed further.

The vibration control section 43 repeatedly references the rotation angle information output by the actuator 141 at predetermined timing intervals. When the rotation angle output by the actuator 141 reaches the target angle within a predetermined time period after the start of control, the target angle θt for the rotation angle of the actuator 141 is updated by θt+Δθ. Again, under feedback control, the tip of the arm 142 is moved. Here, the angle Δθ is to be determined beforehand.

In the case where, despite the control over the rotation direction and rotation velocity, the rotation angle output by the actuator 141 fails to reach the target angle within a predetermined time period after the start of control (i.e., the position Q of the back surface 131B of the push-in button 131 is closer to the second position than to the position of the tip of the arm 142 rotated to the target angle, so that the tip of the arm 142 comes into contact with the push-in button 131 and stops at the position Q), the vibration control section 43 switches from feedback control to a control scheme (vibration control) under which the vibration control section 43 controls the rotation angle amplitude of the actuator 141 on the basis of the vibration strength information included in the vibration instruction received by the reception section 41. In so doing, the vibration control section 43 causes the actuator 141 to continuously reciprocate across the amplitude, causing likewise the arm 142 to continuously reciprocate across the amplitude.

At the start of vibration control, the vibration control section 43 retains the position of the arm 142 (rotation angle of the actuator 141) as an initial position θs. Initially, the correction value k of the amplitude is set for λ=λmin, where λmin is a value of 0 or larger and smaller than 1.

The vibration control section 43 vibrates the tip of the arm 142 (under vibration control) by setting the actuator 141 to rotate reciprocatingly between two angles: the angle at which the actuator 141 is rotated by λ·θb from the initial position θs in the direction in which the push-in button 131 is pushed up (i.e., θs+λ·θb) on one hand, and the angle at which the actuator 141 is rotated by λ·θa from the initial position θs into the housing (i.e., θs−λ·θa) on the other hand.

By referencing the rotation angle output by the actuator 141 under vibration control, the vibration control section 43 obtains a rotation angle θu on the upper side when the arm 142 is most outside the housing (close to the first position). When the rotation angle θu satisfies the relation θs−θu>θth (where θth is a positive threshold value) (i.e., when, after the start of vibration, the push-button 131 is pushed into the housing by more than a predetermined movement amount), the vibration control section 43 assumes that the amplitude correction value λ is set for λ=1, and sets the actuator 141 to rotate reciprocatingly between two angles: the angle at which the actuator 141 is rotated by λ·θb from the rotation angle θu in the direction in which the push-in button 131 is pushed up (i.e., θu+λ·θb) on one hand, and the angle at which the actuator 141 is rotated by λ·θa from the rotation angle θu into the housing (i.e., θu−λ·θa) on the other hand.

Meanwhile, when the relation 0≤θs−θu≤θth is satisfied, the vibration control section 43 assumes that the amplitude correction value λ is set for λ=f(θs−θu), where f(x) is a monotonically increasing function with respect to "x." Given x>θth, then f(x)=1, where f(0)=λmin.

The vibration control section 43 then sets the actuator 141 to rotate reciprocatingly between two angles: the angle at which the actuator 141 is rotated by λ·θb from the rotation angle θu in the direction in which the push-in button 131 is pushed up (i.e., θu+λ·θb) on one hand, and the angle at which the actuator 141 is rotated by λ·θa from the rotation angle θu into the housing (i.e., θu−λ·θa) on the other hand.

That is, in this embodiment, when the push-in button 131 is to be presented with vibration by vibrating the arm 142, the vibration control section 43 retains, as initial position information, the information regarding the position of the arm 142 corresponding to the position of the push-in button 131 in the vibration start position (the information used in the above example is the rotation angle of the actuator 141 in a position where the arm 142 is in contact with the push-in button 131). The further the push-in button 131 is pushed beyond the position designated by the initial position information, the larger the vibration amplitude (strength) is made. Also, the closer the arm 142 is to the initial position, the smaller the vibration amplitude (strength) becomes.

In this manner, it is possible to suppress the noise generated when the vibration is presented in a state where the user's fingertip is leaving the push-in button 131 (the state in which the push-in button 131 is returning to the first position from the pushed-in position, i.e., the state where the push-in button 131 is pushed further from the initial position, before returning to the initial position).

[Operations]

The controller apparatus 1 of this embodiment in the above configuration operates as explained below. In an example that follows, the controller apparatus 1 sets the amplitude θa of the arm 142 using a monotonically increasing function in which, given the vibration strength "s" designated by the information processing apparatus 2, the amplitude θa is monotonically increased for θa=α·s (α is an experimentally determined positive constant) except at the start of vibration or except when the push-in button 131 is pushed to the limit (with the back surface 131B reaching a position within the position stage P9).

Initially, it is assumed that the user grips the controller apparatus 1 and pushes the push-in button 131 until its back surface 131B reaches the position Q within the position stage P4. At this time, a game application running on the information processing apparatus 2 performs a process of outputting a vibration instruction including the vibration strength information specifying that vibration be generated with a predetermined strength "s." Upon receipt of the vibration instruction, the processor 151 operates as follows:

The processor 151 detects that the back surface 131B of the push-in button 131 is in the position Q. The processor 151 then sets the target position of the arm 142 at the position Q of the back surface 131B of the push-in button 131. The processor 151 further sets as the target angle the rotation angle θt of the actuator 141 at the time the arm 142 reaches the target position. The processor 151 then performs feedback control such that the rotation direction and rotation velocity of the actuator 141 are controlled on the basis of the information regarding the current rotation angle and the target angle output by the actuator 141.

The processor 151 repeatedly references the rotation angle information output by the actuator 141 at predetermined timing intervals. When the rotation angle output by the actuator 141 reaches the target angle θt within a predetermined time period after the start of feedback control, the processor 151 sets the amplitude correction value λ for λ=λmin, and vibrates the tip of the arm 142 (under vibration control) by setting the actuator 141 to rotate reciprocatingly between two angles: the angle at which the actuator 141 is rotated by λ·θb from the target angle θt in the direction in which the push-in button 131 is pushed up (i.e., θs+λ·θb) on one hand, and the angle at which the actuator 141 is rotated by λ·θa from the initial position θs into the housing (i.e., θs−λ·θa) on the other hand.

Thereafter, by referencing the rotation angle output by the actuator 141 under vibration control, the processor 151 obtains the rotation angle θu on the upper side when the arm 142 is most outside the housing (close to the first position). When the rotation angle θu satisfies the relation θs−θu>θth (where θth is a positive threshold value), the processor 151 assumes that the amplitude correction value λ is set for λ=1, and sets the actuator 141 to rotate reciprocatingly between two angles: the angle at which the actuator 141 is rotated by λ·θb from the rotation angle θu in the direction in which the push-in button 131 is pushed up (i.e., θu+λ·θb) on one hand, and the angle at which the actuator 141 is rotated by λ·θa from the rotation angle θu into the housing (i.e., θu−λ·θa) on the other hand. Meanwhile, when the relation θ≤θs−θu≤θth is satisfied, the processor 151 sets the amplitude correction value λ for λ=f(θs−θu), where f(x) is a monotonically increasing function with respect to "x." Given x>θth, then f(x)=1, where f(0)=λmin.

The processor 151 then sets the actuator 141 to rotate reciprocatingly between two angles: the angle at which the actuator 141 is rotated by λ·θb from the rotation angle θu in the direction in which the push-in button 131 is pushed up (i.e., θu+λ·θb) on one hand, and the angle at which the actuator 141 is rotated by λ·θa from the rotation angle θu into the housing (i.e., θu−λ·θa) on the other hand.

Under the above control, in the state where the user is pushing the external surface 131F of the push-in button 131 with the fingertip (i.e., where the external surface 131F is under the force of the fingertip), the push-in button 131 is moved into the housing from a position equivalent to the initial position, the correction value λ is monotonically increased, and the vibration is increased accordingly. When the push-in button 131 is pushed by more than a predetermined push-in amount from the position equivalent to the initial position, then the correction value λ is set for λ=1, so that the predetermined vibration is presented.

Thereafter, when the user stops pushing the push-in button 131 (or reduces the pushing force), the push-in button 131 returns to the position equivalent to the initial position, the correction value λ is monotonically decreased, and the vibration is reduced accordingly. When the push-in button 131 is moved close to the default position beyond the position equivalent to the initial position, the vibration is not presented.

Thus, in the state where the user's fingertip does not act as a vibration damper (i.e., the state in which the user's fingertip is not fully in contact with the push-in button 131), the vibration is reduced and the generation of noise is suppressed.

Suppose that the user pushes the push-in button 131 until its back surface 131B reaches the position P within the position stage P9, and then pushes the push-in button 131 further to the limit (with the back surface 131B of the push-in button 131 reaching the second position Pb). During this time, a game application running on the information processing apparatus 2 may perform a process of outputting a vibration instruction including the vibration strength information specifying that vibration be generated with a predetermined strength "s." Upon receipt of the vibration instruction, the processor 151 operates as follows:

The processor 151 detects that the back surface 131B of the push-in button 131 is in the position Pb. The processor 151 then sets the target position of the arm 142 at the position P of the back surface 131B of the push-in button 131. The processor 151 further sets as the target angle the rotation angle θt of the actuator 141 at the time the arm 142 reaches the target position. The processor 151 then performs feedback control such that the rotation direction and rotation velocity of the actuator 141 are controlled on the basis of the information regarding the current rotation angle and the target angle output by the actuator 141.

The processor 151 repeatedly references the rotation angle information output by the actuator 141 at predetermined timing intervals. When the rotation angle output by the actuator 141 reaches the target angle θt within a predetermined time period after the start of feedback control, the processor 151 thereupon switches from feedback control to determination of the rotation angle amplitude of the actuator 141 on the basis of the vibration strength information included in the received vibration instruction.

Specifically, the smaller the difference is between the position P of the back surface 131B of the push-in button 131 on one hand and the position Pb constituting the most pushed-in position of the back surface 131B of the push-in button 131 on the other hand, the closer the value of a monotonic function g(P) of the position P is to "0" (this is a function whose value is between "0" and "1" inclusive, wherever the position), and the larger the difference, the closer the value of the function is to "1." The value of the vibration strength is corrected by multiplying the monotonic function g(P) of the position P by the value "s" of the strength designated by the vibration strength information.

That is, the amplitude θa is set for θa=α·g(P)·s.

The processor 151 then establishes the amplitude between two angles: the angle at which the position of the arm 142 is rotated by θb from the target angle θt in the direction in which the push-in button 131 is pushed up (i.e., θt+θb) on one hand, and the angle at which the position of the arm 142 is rotated by θa, determined by the above-described method, from the target angle θt into the housing (i.e., θt−θa) on the other hand. Control (vibration control) is performed such that the actuator 141 is caused to continuously reciprocate across this amplitude range, causing the arm 142 to vibrate. The amount θb is a predetermined value.

Here, the processor 151 determines, during vibration control, whether or not the rotation angle θ output by the actuator 141 becomes larger than a predetermined threshold value θh (0<θh≤θb) in the direction in which the push-in button 131 is pushed up from the previously set target angle θt (i.e., whether or not the relation θ>θt+θh is satisfied).

In this example, it is assumed that the rotation angle θ output by the actuator 141 does not exceed the predetermined threshold value θh in the direction in which the push-in button 131 is pushed up from the target angle θt+Δθ.

Thereafter, the processor 151 repeatedly acquires the back surface 131B of the push-in button 131 and sets the amplitude θa for θa=α·g(P)·s for vibration control. The correction function g(P) causes the processor 151 to perform control such that the larger the amount by which the user pushes the push-in button 131, the smaller the amplitude becomes.

Under the above control, the amplitude of the vibration is restricted when the push-in button 131 is pushed to the limit. The user is thus presented with the vibration designated typically by a game application, with no unintended noise generated.

It should be understood by those skilled in the art that various modifications, combinations, sub-combinations and alterations may occur depending on design requirements and other factors insofar as they are within the scope of the appended claims or the equivalents thereof.

What is claimed is:

1. A controller apparatus comprising:
    a vibrating body having an arm that is rotationally movable within a predetermined rotational movable range;
    an operating member having a front surface for pressing by a user, such that the operating member is axially movable within a predetermined axially movable range, overlapping at least partially with the predetermined rotational movable range of the vibrating body;
    a reception section configured to receive a vibration instruction designating generation of vibration;
    a detection section configured to detect an axial position of the operating member within the predetermined axially movable range; and
    a control section configured to give vibration to the operating member by controlling a rotational position and vibration strength of the arm of the vibrating body in accordance with the received vibration instruction and the detected axial position of the operating member,
    wherein, when predetermined conditions are satisfied, the control section changes the vibration of the vibrating body in a manner correcting the vibration designated by the vibration instruction, as a function of an axial position of the operating member within the predetermined axially movable range.

2. The controller apparatus according to claim 1, wherein
    the vibration instruction includes information for designating strength of vibration, and
    when the predetermined conditions are satisfied, the control section corrects the designated vibration strength by a predetermined correction method, so as to control the vibration of the vibrating body in a manner giving vibration to the operating member with the corrected vibration strength.

3. The controller apparatus according to claim 2, wherein a method of the correction involves reducing the designated vibration strength.

4. The controller apparatus according to claim 1, wherein
    the movable range of the operating member ranges from a first position of the operating member not operated by the user to a second position of the operating member in a limit position up to which the user pushes the operating member into a housing of the controller apparatus, and
    the predetermined conditions include either
    a condition specifying that the operating member be in the second position, or
    a condition specifying that the position of the operating member be moved starting from a time at which the vibrating body starts vibrating.

5. A method for use with a controller apparatus including a vibrating body having an arm that is rotationally movable within a predetermined rotational movable range, an operating member having a front surface for pressing by a user, such that the operating member is axially movable within a predetermined axially movable range, overlapping at least partially with the predetermined rotational movable range of the vibrating body, a reception section configured to receive a vibration instruction designating generation of vibration, a detection section configured to detect an axial position of the operating member within the predetermined axially movable range, and a control section, the controller apparatus controlling method comprising:
    causing the control section to give vibration to the operating member by controlling a rotational position and vibration strength of the arm of the vibrating body in accordance with the received vibration instruction and the detected axial position of the operating member; and
    causing the control section, when predetermined conditions are satisfied, to control change the vibration of the vibrating body in a manner correcting the vibration designated by the vibration instruction, as a function of an axial position of the operating member within the predetermined axially movable range.

6. A non-transitory, computer readable storage medium containing a computer program for use with a controller apparatus, the controller apparatus including a vibrating body having an arm that is rotationally movable within a predetermined rotational movable range, an operating member having a front surface for pressing by a user, such that the operating member is axially movable within a predetermined axially movable range, overlapping at least partially with the predetermined rotational movable range of the vibrating body, a reception section configured to receive a vibration instruction designating generation of vibration, a detection section configured to detect an axial position of the operating member within the predetermined axially movable range, and a control section, the computer program, when executed by a computer system causes the computer system to carry out actions, comprising:

causing the control section to give vibration to the operating member by controlling a rotational position and vibration strength of the arm of the vibrating body in accordance with the received vibration instruction and the detected axial position of the operating member; and causing the control section, when predetermined conditions are satisfied, to change the vibration of the vibrating body in a manner correcting the vibration designated by the vibration instruction, as a function of an axial position of the operating member within the predetermined axially movable range.

* * * * *